3,483,031
Patented Dec. 9, 1969

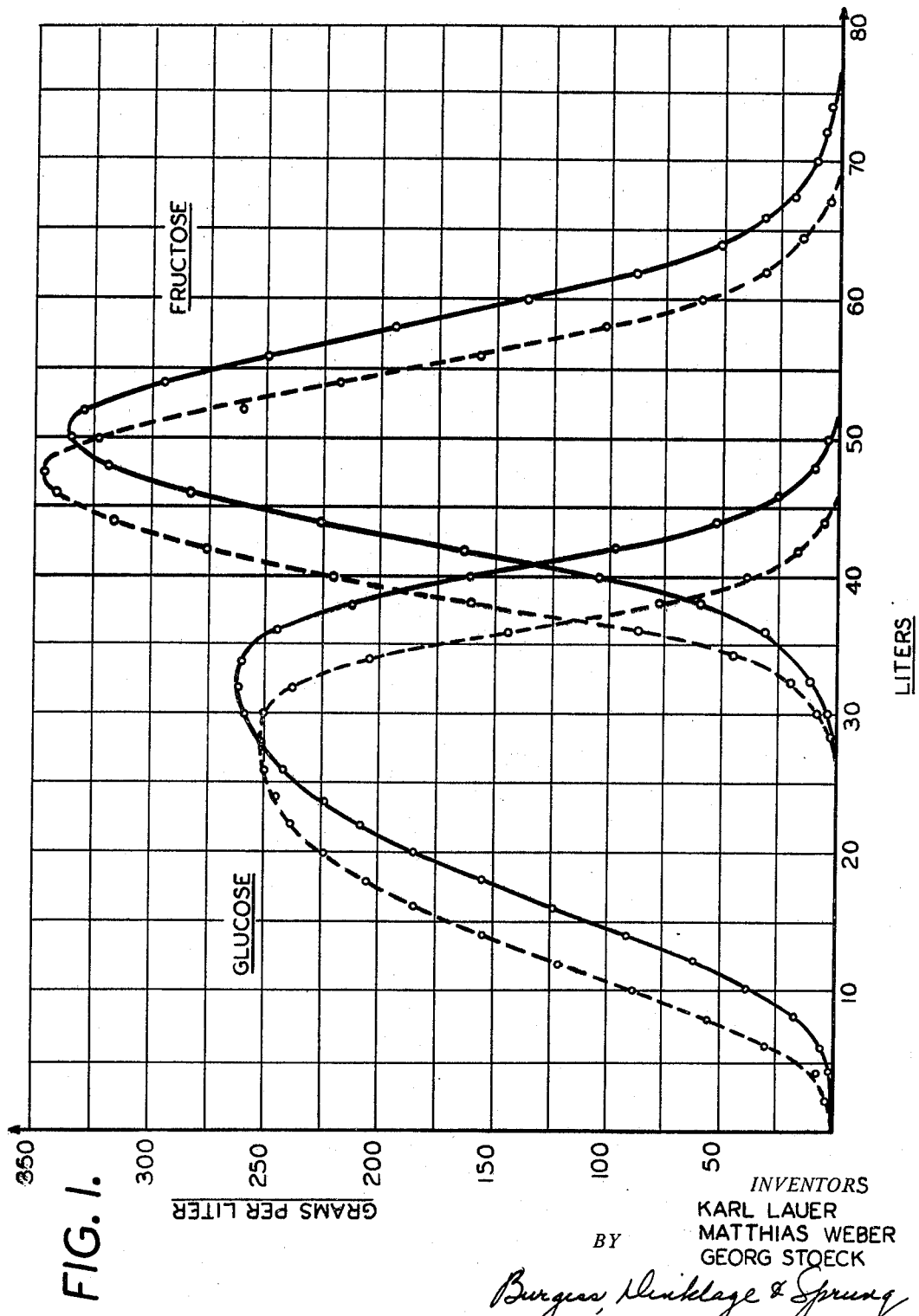
FIG. I.

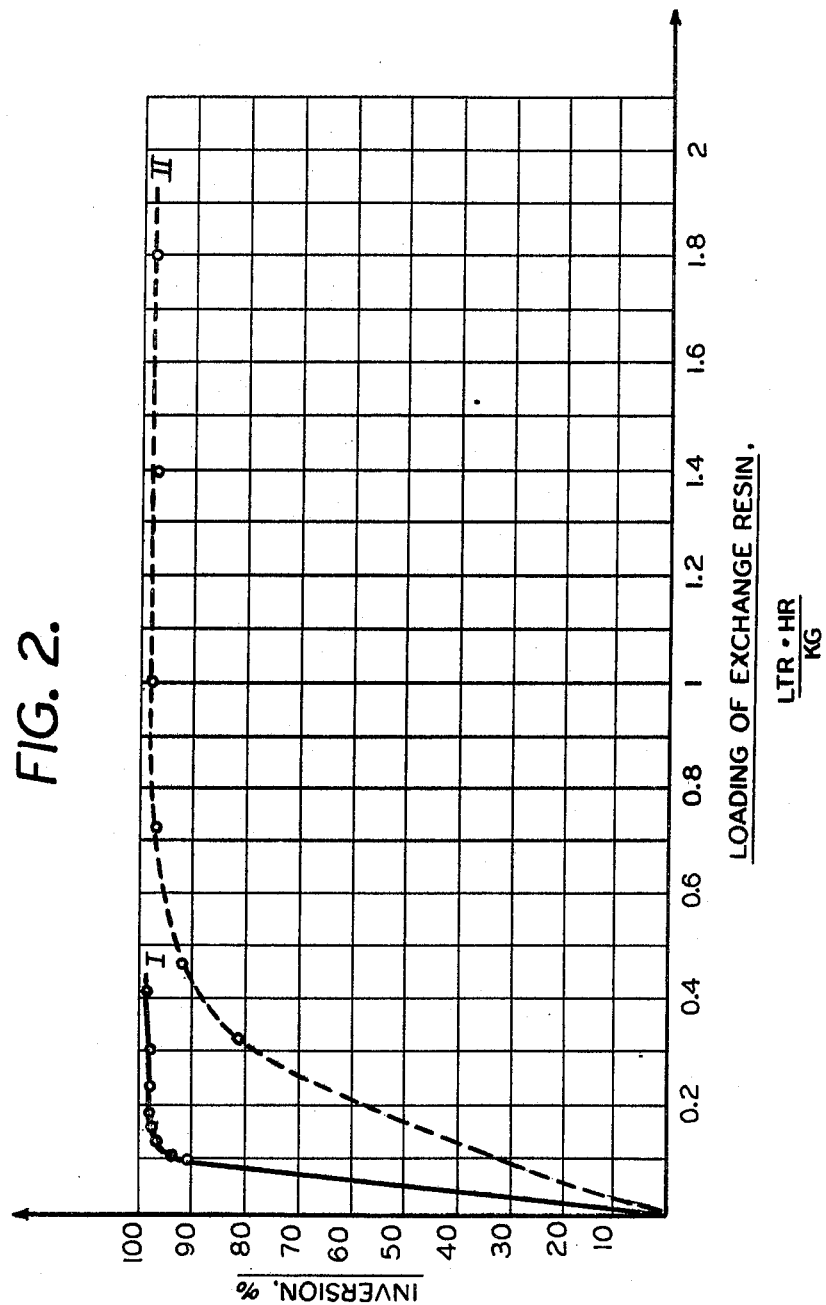

3,483,031
METHOD OF RECOVERING PURE GLUCOSE AND FRUCTOSE FROM SUCROSE OR FROM SUCROSE-CONTAINING INVERT SUGARS
Karl Lauer, Schriesheim, Matthias Weber, Ludwigshafen (Rhine), and Georg Stoeck, Mannheim-Waldhof, Germany, assignors to C. F. Boehringer & Soehne GmbH, Mannheim-Waldhof, Germany
Filed Aug. 1, 1966, Ser. No. 569,326
Claims priority, application Germany, Aug. 5, 1965, B 83,146
Int. Cl. C13k 3/00
U.S. Cl. 127—41                                10 Claims

ABSTRACT OF THE DISCLOSURE

Process for recovering fructose and glucose from sucrose or from mixtures of sucrose, glucose and fructose, comprising inverting the sucrose and effecting the separate recover of glucose and fructose by contacting an aqueous solution of sucrose or of sucrose containing invert sugar with an ion exchanger charged with calcium ions, wherein said exchanger contains from 1 to 30% free acid groups.

---

The present invention relates to a method of recovering pure glucose and fructose from sucrose or from sucrose-containing invert sugars. More particularly, this invention relates to a method of recovering pure glucose and fructose from sucrose or from sucrose containing invert sugars utilizing in exchangers.

In U.S. Pat. No. 3,044,904, it is disclosed that glucose and fructose can be separated from aqueous solutions thereof on a cation exchanger of the cross-linked sulfonated polystyrene type charged with calcium ions. It has been found that this process gives good results when an approximately 50% sugar solution is allowed to run through a suffcently long exchanger column at about 60° C. The length of the column must be about twice that which is given in the above-mentioned U.S. patent.

A mixture from which there is to be separated, preferably, equal parts of fructose and glucose, is known as invert sugar and is obtained by the hydrolysis (inversion) of sucrose. There are also naturally-occurring mixtures of glucose and fructose usually together with sucrose, as, for example, in cane sugar juice and in cane sugar molasses. After separation of the remaining components of the juice or of the molasses, such mixtures can also be used as starting material for the above-mentioned known process. However, just as in the case of the production of invert sugar mixtures, the sucrose present must first be "inverted."

The process of U.S. Pat. No. 3,044,904 thus only has a technical importance when the starting materials necessary therefor can be produced in a simple and cheap manner and, in particular, free from impurities, for example, of inorganic salts. Therefore, in the case of the known procedures for the hydrolysis of sucrose with mineral acids, either the acid ions must be removed by an anion exchanger or the hydrolysis must be carried out in known manner on a cation exchange resin in the H-form. It is known that, in the case of the hydrolysis of sucrose on cation exchange resins, in the H-form, a complete hydrolysis is only possible with very long residence times of the sucrose on the exchanger and that, as a result, generally, the sugar solution must be passed several times over the exchanger (c.f. Dissertation, M. M. Reynolds, University of Colorado, Department of Chemical Engineering, 1947). It is also known that invert sugar solutions passed over exchangers in the pure H-form suffer undesirable discolorations when exposed to elevated temperatures and comparatively long residence times. The same thing happens with glucose and fructose solutions which have been produced by inversion with mineral acids and thereafter passed over a basic exchanger for the purpose of removing acid ions.

Accordingly, it is an object of the present invention to improve the efficiency of the process for obtaining glucose and fructose from sucrose or sucrose containing invert sugar.

An additional object is to devise an improved method for obtaining glucose and fructose from aqueous solutions thereof on a cation exchanger.

A further object is to reduce by-product formation when invert solutions or glucose and fructose solutions produced by inversion with mineral acids are passed over cation exchangers.

A still further object is to prepare glucose and fructose in good yields from sucrose or sucrose containing invert sugars in a novel and rapid manner.

Still further objects and the entire scope of applicability of the present invention will become apparent from the detailed description given hereinafter.

The exact nature and objects of the invention may be more readily understood by referring to the attached drawings, in which FIG. 1 is a graphical representation of data relating to the separation of sucrose and of glucose and fructose on a cation exchanger charged with calcium ions; and FIG. 2 is a graphical representation of data showing the inversion of a sucrose solution on a cation exchanger.

In accordance with the invention, it has now, surprisingly, been found that glucose and fructose are obtained from mixtures of sucrose, glucose and fructose by passing such a mixture into contact with a cation exchanger which has been fully charged at room temperature, i.e., within the range of 15° to 25° C. with a neutral calcium salt solution and preferably a neutral calcium chloride solution. In accordance with the invention, sucrose is no longer to be found in the eluates and that, even pure sucrose, on being passed through an exchanger column of this type, is fully inverted, fructose and glucose emerging from the column in separate fractions in precisely the same way as if the equivalent amounts of fructose and glucose had been applied to the column.

Further investigation of the cation exchanger which has been competely charged at room temperature with a neutral calcium chloride solution has shown that this exchanger, contrary to the expectations, is still present in the free H-form to an extent of about 3 to 5%. These free H-equivalencies are only completely saturated with calcium when the charging is carried out with the same calcium chloride solution but at 60° C. or when the charging is carried out at room temperature with a calcium chloride solution, the pH of which is >8, as, for example 9–10. Completely charged cation exchanger columns of this same type but in the Ca-form exert no hydrolysis action whatsoever on sucrose and thus, when they are used, sucrose passes through the column completely unchanged. Apparently, they correspond to the exchanger columns as used in the above-mentioned U.S. Patent 3,044,904.

Thus, according to the present invention, there is provided a process for obtaining pure fructose and glucose from sucrose or sucrose-containing invert sugars, by passing an aqueous solution of sucrose or sucrose-containing invert sugar over an ion exchanger charged with calcium ions, wherein said exchanger still contains 1–30% of free acid groups.

The ion exchangers to be used for carrying out the process of the present invention can be obtained by fully charging cation exchangers at room temperature with calcium salt solutions and preferably a calcium chloride solution having a pH of <8.

Surprisingly, such cation exchanger columns charged with calcium ions, which still contain 1–30% of free H-form, show substantially no detectable difference in the ability to separate glucose and fructose from columns which are fully charged. There takes place not only a complete hydrolysis of the sucrose applied but also a substantial separation of the glucose and fructose. No difference is shown in comparison with a separation carried out under the same conditions of a previously hydrolyzed glucose-fructose mixture. When, for example, a 50% sucrose solution is introduced into and passed through a column of this type (velocity 1.0–2 ml. sucrose solution/cm.$^2$/min.), then application must be made for quite a long time in order to achieve a sufficient capacity of the column. Since, according to the above-mentioned investigations by Reynolds with cation exchangers in the 100% H-form, the hydrolysis requires some time and certainly does not take place instantaneously; in the present case, too, the sucrose must only be gradually hydrolyzed upon further penetration into the column so that the zones in which fructose and glucose result from the sucrose are widely distributed throughout the column. Therefore, a substantial "obliteration" of the separation curves for glucose and fructose was to have been expected. Surprisingly, however, the opposite is the case: In FIGURE 1 of the accompanying drawings, a detailed explanation of which is given hereinafter, it is established that with the use of a column having a diameter of 15 cm. and an overall length of 9.0 meters, upon application of 12.0 kg. sucrose in 24 liters water, substantially the same result is achieved as in the case of the application of 6.3 kg. fructose and 6.3 kg. anhydrous glucose in 24 liters of solution, the application time in both cases amounting to 90 minutes.

The discovery according to the present invention is all the more surprising when the ability to hydrolyze of an exchanger only partially charged with calcium ions is compared with an exchanger in the pure H-form. As is to be expected, the hydrolysis with an exchanger in the 100% H-form takes place more quickly than with an exchanger which is only partially present in the H-form. In FIGURE 2 of the accompanying drawings, a detailed explanation of which is given hereinafter, the inversion of a 60% sugar solution at 70° C. in dependence upon the exchanger charging is shown. The first run is carried out with the exchanger in pure H-form and the second time with a calcium-charged exchanger which still contains 20% H-form. It can be seen from the drawing that the inversion on the 20% H-form takes place five times more slowly than on the 100% H-form. Therefore, in the instance of a 10% content of the free H-form, the hydrolysis must be retarded tenfold and in the case of a 3–5% H-form, such as is obtained in the case of treatment of the exchanger with a neutral calcium chloride solution at room temperature, the hydrolysis should take place even more slowly, for example, 20–30 times more slowly. Nevertheless, the result on the separated fructose and glucose is the same when sucrose is used as when a mixture of fructose and glucose is used under the same conditions.

Thus, by the use according to the present invention of a cation exchanger column charged with calcium ions in which 1–30% of the H-ions originally present are still free, sucrose can be directly separated into glucose and fructose. Consequently, the process according to the present invention has greater advantages in comparison with a process requiring the separate hydrolysis of sucrose to invert sugar and subsequent application of this invert sugar mixture, according to the process of the above-mentioned U.S. Patent No. 3,044,904, to an exchanger column charged with calcium ions which exchanger no longer contains the free H-form. In the case of the new process according to the present invention, no separate operations are necessary as no colored or other decomposition products result therefrom. The fructose-glucose fractions obtained are completely pure and colorless and, in addition, the exchanger resin remains uncolored.

The process according to the present invention is preferably carried out at an elevated temperature, as, for example, at about 50–70° C.

As cation exchanger, there is advantageously used a cross-linked, sulfonated, polystyrene resin which has been treated at room temperature with an aqueous solution of a calcium salt, preferably with a calcium chloride solution having a pH of <8.

The concentration of the sugar solution to be separated can amount to about 60%. More concentrated solutions should be diluted to this range of values because of their high viscosity and because of their de-swelling effect on the exchanger resin.

The velocity of flow of the solution through the exchanger is preferably 0.5–3 ml./cm.$^2$/min., and most preferably 1–2 ml./cm.$^2$/min.

The solutions emerging from the column are analyzed and collected in separate fractions. The working up of the glucose- and fructose-containing fractions then takes place in the usual manner, for example, by evaporation and crystallization.

The process according to the present invention can be applied in an especially advantageous manner in columns which work according to the countercurrent principle with a moving bed of exchanger and with the liquid flowing in the opposite direction.

Referring to the drawing:

In FIGURE 1, the separation of sucrose or of glucose and fructose on a cation exchanger charged with calcium ions with 3% in the free H-form is shown.

Curve I is based on the following data:

12 kg. sucrose in 24 liters of solution, 60° C.
application time: 90 minutes
elution rate: 18 liters/hr.
first runnings: 97 kg.

Curve II is based on the following data:

6.3 kg. glucose and 6.3 kg. fructose (corresponding to 12 kg. sucrose) in 24 liters of solution, 60° C.
application time: 90 minutes
elution rate: 18 liters/hr.
first runnings: 101 kg.

The drawing establishes that with the use of a column having a diameter of 15 cm. and an overall length of 9.0 meters, upon application of 12.0 kg. sucrose in 24 liters water, substantially the same result is achieved as in the case of the application of 6.3 kg. fructose and 6.3 kg. anhydrous glucose in 24 liters of solution, the application time in both cases amounting to 90 minutes.

In FIGURE 2, the inversion of a 60% sucrose solution at 70° on cation exchanger is set out.

Curve I of FIG. 2 is based on the following data:

cation exchanger in 100% H-form (1.25 equivalents H+/liter exchanger).

Curve II of FIG. 2 is based on the following data:

calcium-charged cation exchanger with 20% free H-form (0.25 equivalents H+/liter exchanger).

$$\text{exchanger loading} = \frac{\text{amount of exchanger (liters)}}{\text{throughput of sugar (kg./hr.)}}$$

This figure shows the inversion of a 60% sugar solution at 70° C. in dependence upon the exchanger charging, and that the degree of inversion of the sucrose clearly depends on the amount of exchanger in H-form, being much quicker, when the exchanger is completely in the H-form.

The following examples are given for the purpose of illustrating the present invention and are in no wise to be construed as limitative thereof. In the examples the following apparatus, working conditions, etc., were employed:

(a) Apparatus.—There was employed a glass exchanger column having a diameter of 15 cm. and a cross-section of 182 cm.$^2$. In order to provide a sufficient length for the exchanger column, 6 glass tubes, each of a length of 2 meters, were connected together. The depth of the exchanger bed maintained in each of the sections was 1.5 meters, the overall length of the column was 9.0 meters and the total volume was 170 liters. By this division of the column into individual sections, the effect of the swelling and de-swelling phenomena on the resin was substantially removed and the possibility of the glass column bursting due to considerable swelling was avoided. Furthermore, the joining of column sections had the advantage that the separation effect could be followed analytically at the several sections of the column. The column was heated by means of a circulatory water heating system. As exchanger resin, there was employed a sulfonated, slightly cross-linked (2–6% cross-linkage), polystyrene resin in the calcium form (mesh 50–200, capacity 1–4 Val H$^+$-ions per liter, ball-shaped), i.e., "Dowex 50 WX 4." ("Dowex" is a registered trademark of Dow Chemical Company.) The charging of the resin was carried out with a 10% calcium chloride solution having a pH of 8 until the solution flowing out no longer registered acidic. The resin was thereafter thoroughly washed with ion-free water.

If the ion exchanger was charged at room temperature, i.e., 20° C., with calcium ions, then, upon again treating the column with a 10% calcium chloride solution having the same pH value but at a temperature of 60° C., it could be established that more than 6 mol hydrogen chloride could be liberated. As 1 liter of exchanger resin in the H-form contained about 1.3 equivalents of H-ions, the 170 liters of exchanger resin as used herein corresponded to about 220 equivalents of acid. Consequently, in the case of the charging of the ion exchanger with calcium ions at room temperature, about 3% will remain in the H-form, in spite of the large excess which had been employed.

(b) Analysis.—In order to follow the separation action, as well as the influence of such factors as temperature, concentration and flow through velocity, a sufficiently accurate and rapidly-working analytical procedure was necessary. The measurement and evaluation of the angle of rotation and refractive index of the solutions as functions of the fructose and glucose concentrations which are utilized in the form of a nomogram have proved to be most successful for this purpose, the same being disclosed in detail in copending application Ser. No. 569,327.

(c) Working conditions.—8 liters of a 50% aqueous sugar solution were supplied to the column head of the first column unit as mentioned in (a) above, with the aid of a dosage pump. After the sugar solution had soaked into the exchanger bed, elution was carried out with distilled water supplied at a rate of 16 liters/hour, without interruption. The fractions which emerged from the lower end of the last exchanger column unit were analyzed in the manner described in (b) above and, if desired, collected separately. In all cases, the working temperature amounted to 60° C. Under these conditions, the first sugar-containing fractions emerged from the column after about 3 to 5 hours and the last sugar-containing fractions emerged from the column after a further 3 to 5 hours.

EXAMPLE I

Inversion and separation of a sucrose-containing invert sugar solution 8 liters of an invert sugar solution, which contained 1.5 kg. fructose, 1.5 kg. glucose and 1 kg. sucrose, were separated in the manner described in (c) above. The treatment of the ion exchanger with excess calcium chloride solution was carried out at room temperature, i.e., 20° C. The apparatus following such treatment was heated up to the working temperature of 60° C. The sugar-containing fractions which emerged from the lower end of the last column were analyzed every 10 minutes and the sugar contents which were observed reported in the following Table I.

TABLE I

| Fraction No: | Sucrose conc., g./liter | Glucose conc., g./liter | Fructose conc., g./liter |
| --- | --- | --- | --- |
| 1 | 0 | 0 | 0 |
| 2 | 0 | 20 | 0 |
| 3 | 0 | 66 | 0 |
| 4 | 0 | 114 | 0 |
| 5 | 0 | 140 | 0 |
| 6 | 0 | 120 | 2 |
| 7 | 0 | 54 | 9 |
| 8 | 0 | 22 | 32 |
| 9 | 0 | 4 | 93 |
| 10 | 0 | 0 | 132 |
| 11 | 0 | 0 | 126 |
| 12 | 0 | 0 | 78 |
| 13 | 0 | 0 | 36 |
| 14 | 0 | 0 | 14 |
| 15 | 0 | 0 | 3 |
| 16 | 0 | 0 | 0 |

As can be seen, no sucrose is present in any of the emerging fractions, whereas the glucose and fructose emerge from the column substantially separated from one another.

EXAMPLE II

Inversion and separation of pure sucrose 8 liters of a 50% sucrose solution were, as described in Example I above, delivered into an exchanger column which had been charged with calcium chloride at room temperature. The analytical results for the fractions which were recovered from the end of the column are set out in the following Table II.

TABLE II

| Fraction No: | Sucrose conc., g./liter | Glucose conc., g./liter | Fructose conc., g./liter |
| --- | --- | --- | --- |
| 1 | 0 | 6 | 0 |
| 2 | 0 | 29 | 0 |
| 3 | 0 | 77 | 0 |
| 4 | 0 | 136 | 0 |
| 5 | 0 | 141 | 0 |
| 6 | 0 | 119 | 1 |
| 7 | 0 | 76 | 11 |
| 8 | 0 | 31 | 49 |
| 9 | 0 | 6 | 102 |
| 10 | 0 | 0 | 132 |
| 11 | 0 | 0 | 125 |
| 12 | 0 | 0 | 94 |
| 13 | 0 | 0 | 45 |
| 14 | 0 | 0 | 18 |
| 15 | 0 | 0 | 7 |
| 16 | 0 | 0 | 1 |

In this case, also, the sucrose was completely inverted and a substantial separation of the glucose and fructose took place. The concentrations of glucose and fructose in the corresponding fractions were practically identical in Examples I and II.

EXAMPLE III

In order to demonstrate the surprising effect of the process according to the present invention, the following experiment was carried out using a pure calcium ion exchanger, 8 liters of an invert sugar solution which contained 1.5 kg. fructose, 1.5 kg. glucose and 1 kg. sucrose, were separated in the manner described above under (c), the charging of the ion exchanger having been carried out with excess calcium chloride solution at a working temperature of 60° C. The sugar-containing fractions which emerged from the lower end of the column were analyzed every 10 minutes; the results which were obtained are set out in the following Table III:

TABLE III

| Fraction No: | Sucrose conc., g./liter | Glucose conc., g./liter | Fructose conc., g./liter |
|---|---|---|---|
| 1 | 2 | 0 | 0 |
| 2 | 9 | 0 | 0 |
| 3 | 16 | 0 | 0 |
| 4 | 45 | 0 | 0 |
| 5 | 63 | 0 | 0 |
| 6 | 62 | 8 | 0 |
| 7 | 42 | 27 | 0 |
| 8 | 15 | 54 | 0 |
| 9 | 2 | 75 | 0 |
| 10 | 0 | 94 | 0 |
| 11 | 0 | 113 | 0 |
| 12 | 0 | 105 | 0 |
| 13 | 0 | 66 | 2 |
| 14 | 0 | 23 | 4 |
| 15 | 0 | 5 | 8 |
| 16 | 0 | 1 | 21 |
| 17 | 0 | 0 | 54 |
| 18 | 0 | 0 | 92 |
| 19 | 0 | 0 | 112 |
| 20 | 0 | 0 | 87 |
| 21 | 0 | 0 | 54 |
| 22 | 0 | 0 | 28 |
| 23 | 0 | 0 | 12 |
| 24 | 0 | 0 | 4 |
| 25 | 0 | 0 | 2 |

As can be seen, the sucrose emerges unchanged in the first fractions of the eluate. There subsequently follow substantially separated glucose and fructose.

We claim:

1. Process for inverting sucrose and of recovering fructose and glucose from such sucrose or sucrose containing invert sugar, which comprises contacting an aqueous solution of sucrose or of sucrose containing invert sugar with an ion exchanger charged with calcium ions, said exchanger containing from 1 to 30% free acid groups and recovering substantially pure glucose and fructose.

2. Process according to claim 1, wherein said contacting is carried out at a temperature of from 50 to 70° C.

3. Process according to claim 1, wherein said ion exchanger is cross-linked sulfonate polystyrene resin.

4. Process according to claim 1, wherein said aqueous sucrose containing solution has a concentration of up to about 60 weight-percent.

5. Process according to claim 1, wherein said sucrose solution is passed in counter-current flow relationship to said ion exchanger.

6. Process according to claim 1, wherein said ion exchanger is "Dowex 50 WX 4."

7. Process according to claim 1, wherein said exchanger is a cation exchanger which has been fully charged at room temperature with calcium salt solution having a pH<8 so that said exchanger still contains free H-equivalencies.

8. Process according to claim 2, wherein said calcium salt is calcium chloride.

9. Process according to claim 1, wherein said sucrose containing solution is passed through said exchanger at a flow velocity amounting to 0.5–3 ml./cm.$^2$/min.

10. Process according to claim 9, wherein said flow velocity is 1–2 ml./cm.$^2$/min.

References Cited

UNITED STATES PATENTS

| 2,572,848 | 10/1951 | Fitch | 210—38 |
| 2,813,810 | 11/1957 | Smith et al. | 127—46 X |
| 2,890,972 | 6/1959 | Wheaton | 127—46 |
| 3,044,904 | 7/1962 | Serbia | 127—46 |
| 3,044,905 | 7/1962 | Le Fevre | 127—46 |
| 3,044,906 | 7/1962 | Le Fevre | 127—46 |
| 3,174,876 | 3/1965 | Stark | 127—46 |
| 3,184,334 | 5/1965 | Sargent | 127—46 |

FOREIGN PATENTS 67,942  6/1951  Netherlands.

OTHER REFERENCES

Hagerty et al.: "Kinetics of Ion Exchange in the Calcium Cycle," I.&E.C., 45:6, pp. 1253–1259, June 1953.

Bodamer et al.: "Heterogeneous Catalytic Inversion of Sucrose with Cation Exchange Resins," I.&E.C., May 1951, 43.5, pp. 1082–4.

Cavallaro et al.: "On the Problem of Inversion of Sucrose by Ion-Exchange Resins," (abstract) Sugar Industry Abstracts 20; p. 142, 1943.

MORRIS O. WOLK, Primary Examiner

D. G. CONLIN, Assistant Examiner

U.S. Cl. X.R.

127—46; 210—31

PO-1050
(5/69)

UNITED STATES PATENT OFFICE
CERTIFICATE OF CORRECTION

Patent No. 3,483,031                    Dated   December 9, 1969

Inventor(s)   Karl Lauer, Matthias Weber, Georg Stoeck

It is certified that error appears in the above-identified patent and that said Letters Patent are hereby corrected as shown below:

Column 8, claim 8, line 1, "claim 2" should read --claim 7

SIGNED AND
SEALED
MAY 12 1970

(SEAL)
Attest:

Edward M. Fletcher, Jr.
Attesting Officer

WILLIAM E. SCHUYLER, JR.
Commissioner of Patents